G. C. TOUGH.
Chain-Wheel.
No. 205,513. Patented July 2, 1878.
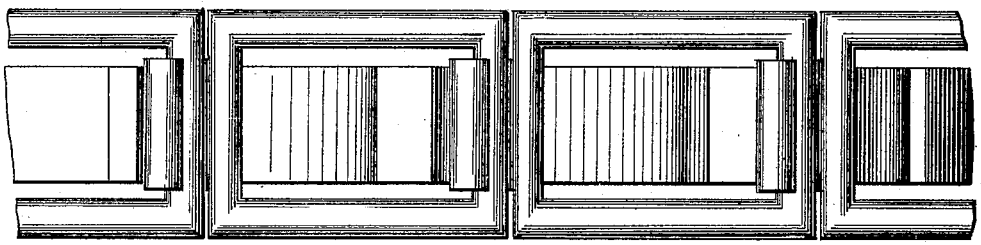
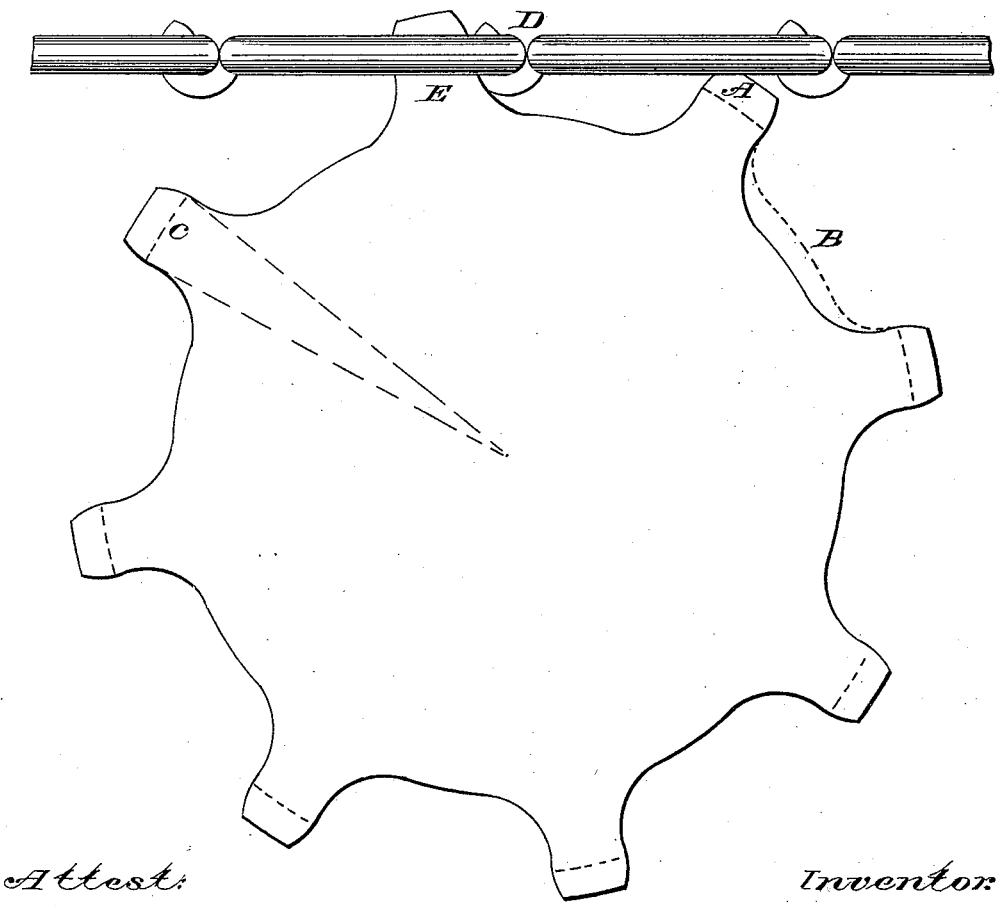

UNITED STATES PATENT OFFICE.

GEORGE C. TOUGH, OF BAY CITY, MICHIGAN.

IMPROVEMENT IN CHAIN-WHEELS.

Specification forming part of Letters Patent No. 205,513, dated July 2, 1878; application filed May 11, 1878.

*To all whom it may concern:*

Be it known that I, GEORGE C. TOUGH, of Bay City, in the county of Bay and State of Michigan, have invented certain Improvements in Chain-Wheels, of which the following is a specification:

The first part of my invention relates to the lengthening of the tooth toward the center of the wheel.

The second part of my invention relates to making the tooth widest at the pitch-line, so that it hugs the chain and prevents it from slipping.

In the accompanying drawings, Figure 1 is a top view of the wheel with chain passing over it. Fig. 2 is a side view of the same.

A and B show the line of tooth for common wrap-wheel. C shows the form of tooth below the pitch-line, the sides being for a certain distance drawn to intersect in or near the center of the wheel. E shows the cross-bar of the chain, fitting the tooth of the wheel.

I claim as my invention—

1. The tooth lengthened toward the center of the wheel, so as to allow the center of cross-bar of the chain to drop below the pitch-line of the tooth.

2. The tooth so formed that a line drawn on each side for a certain distance would intersect in or near the center of the wheel.

GEORGE C. TOUGH.

Witnesses:
   JOHN S. PETHERICK,
   THOMAS CRISPIN.